(12) United States Patent
Mazzarella et al.

(10) Patent No.: US 12,142,040 B2
(45) Date of Patent: Nov. 12, 2024

(54) DYNAMIC SYMBOL-BASED SYSTEM FOR OBJECTS-OF-INTEREST VIDEO ANALYTICS DETECTION

(71) Applicant: Mutualink, Inc., Wallingford, CT (US)

(72) Inventors: Joseph R. Mazzarella, Tolland, CT (US); Michael S. Wengrovitz, Concord, MA (US)

(73) Assignee: MUTUALINK, INC., Wallingford, CT (US)

( * ) Notice: Subject to any disclaimer, the term of this patent is extended or adjusted under 35 U.S.C. 154(b) by 0 days.

(21) Appl. No.: 17/372,096

(22) Filed: Jul. 9, 2021

(65) Prior Publication Data

US 2023/0011079 A1    Jan. 12, 2023

(51) Int. Cl.
| | |
|---|---|
| *G06K 9/00* | (2022.01) |
| *G06K 9/32* | (2006.01) |
| *G06K 9/46* | (2006.01) |
| *G06V 10/40* | (2022.01) |
| *G06V 20/40* | (2022.01) |
| *G06V 20/62* | (2022.01) |
| *G08B 21/18* | (2006.01) |
| *G06V 30/10* | (2022.01) |

(52) U.S. Cl.
CPC .............. *G06V 20/41* (2022.01); *G06V 10/40* (2022.01); *G06V 20/62* (2022.01); *G08B 21/18* (2013.01); *G06V 30/10* (2022.01)

(58) Field of Classification Search
CPC ........ G06V 20/41; G06V 30/10; G06V 10/40; G06V 20/62; G06V 10/96; G06V 20/40; G08B 21/18
See application file for complete search history.

(56) References Cited

U.S. PATENT DOCUMENTS

| | | | |
|---|---|---|---|
| 2008/0184245 A1* | 7/2008 | St-Jean | G06V 10/96 |
| | | | 718/103 |
| 2013/0212065 A1 | 1/2013 | Hach et al. | |

(Continued)

FOREIGN PATENT DOCUMENTS

WO    WO-2014035338 A1 *    3/2014 ............... G06F 8/38

OTHER PUBLICATIONS

Pratik Dubal et al: "Deployment of Customized Deep Learning based Video Analytics On Surveillance Cameras", arxiv.org, Cornell University Library, May 27, 2018; 16 pages.

(Continued)

*Primary Examiner* — Michael J Vanchy, Jr.
(74) *Attorney, Agent, or Firm* — Sterne, Kessler, Goldstein & Fox P.L.L.C.

(57) ABSTRACT

Disclosed herein are system, method, and computer program product embodiments for a dynamic symbol-based system for objects-of-interest (OOI) video analytics detection. Some embodiments include instantiating one or more symbolic objects associated with one or more real world rules, defining an area of interest, associating one or more CV functions with the one or more symbolic objects, and identifying one or more video sources for which to apply the one or more CV functions. Some embodiments further include executing the one or more CV functions associated with the one or more symbolic objects to process the one or more video sources.

20 Claims, 7 Drawing Sheets

(56) References Cited

U.S. PATENT DOCUMENTS

| | | | |
|---|---|---|---|
| 2013/0212130 A1* | 8/2013 | Rahnama | H04W 4/021 |
| | | | 707/792 |
| 2014/0132767 A1* | 5/2014 | Sonnabend | G06V 20/63 |
| | | | 348/148 |
| 2016/0209990 A1* | 7/2016 | Ford | G08G 1/16 |
| 2018/0095607 A1* | 4/2018 | Proctor | G09F 19/226 |
| 2018/0120857 A1* | 5/2018 | Kappauf | G01S 17/931 |
| 2022/0327927 A1* | 10/2022 | Yilma | G08G 1/0133 |

OTHER PUBLICATIONS

International Search Report and Written Opinion directed to related International Application No. PCT/US2022/036400, mailed on Oct. 17, 2022; 12 pages.

* cited by examiner

DYNAMIC SYMBOL-BASED SYSTEM FOR OBJECTS-OF-INTEREST VIDEO ANALYTICS DETECTION

BACKGROUND

Field

The embodiments generally relate to video analytics, and in particular, symbol-based objects-of-interest (OOI) video analytics detection.

Related Art

A visual analytics system may analyze videos and images by applying logical and computational functions to data represented within videos and images. Video analytics systems use a variety of methods to identify objects-of-interest (OOI) from video sources, including, but not limited to, faces, vehicles, license plates, packages, crowds, crowd movements, animals, fire, smoke, gestures, and other OOI. These systems may deploy a relevant computer vision (CV) function for detecting OOI based upon an intended purpose or intended use context.

SUMMARY

Some embodiments include a system, apparatus, device, method and/or computer program product embodiments, and/or combinations and sub-combinations thereof, for a dynamic symbol-based system for detecting objects-of-interest (OOI). Some embodiments include instantiating a symbol associated with a real world rule, instantiating an area of interest, associating a computer vision (CV) function with the instantiated symbol, identifying video sources from which to process the selected CV function based on an area of interest, transmitting instructions containing the CV function and video sources from which the CV function may be processed, and processing the CV function from the video sources.

BRIEF DESCRIPTION OF THE DRAWINGS

The accompanying drawings are incorporated herein and form a part of the specification. The drawings illustrate the presented disclosure and, together with the description, further serve to explain the principles of the disclosure and enable a person of skill in the relevant art(s) to make and use the disclosure.

Figure 1:
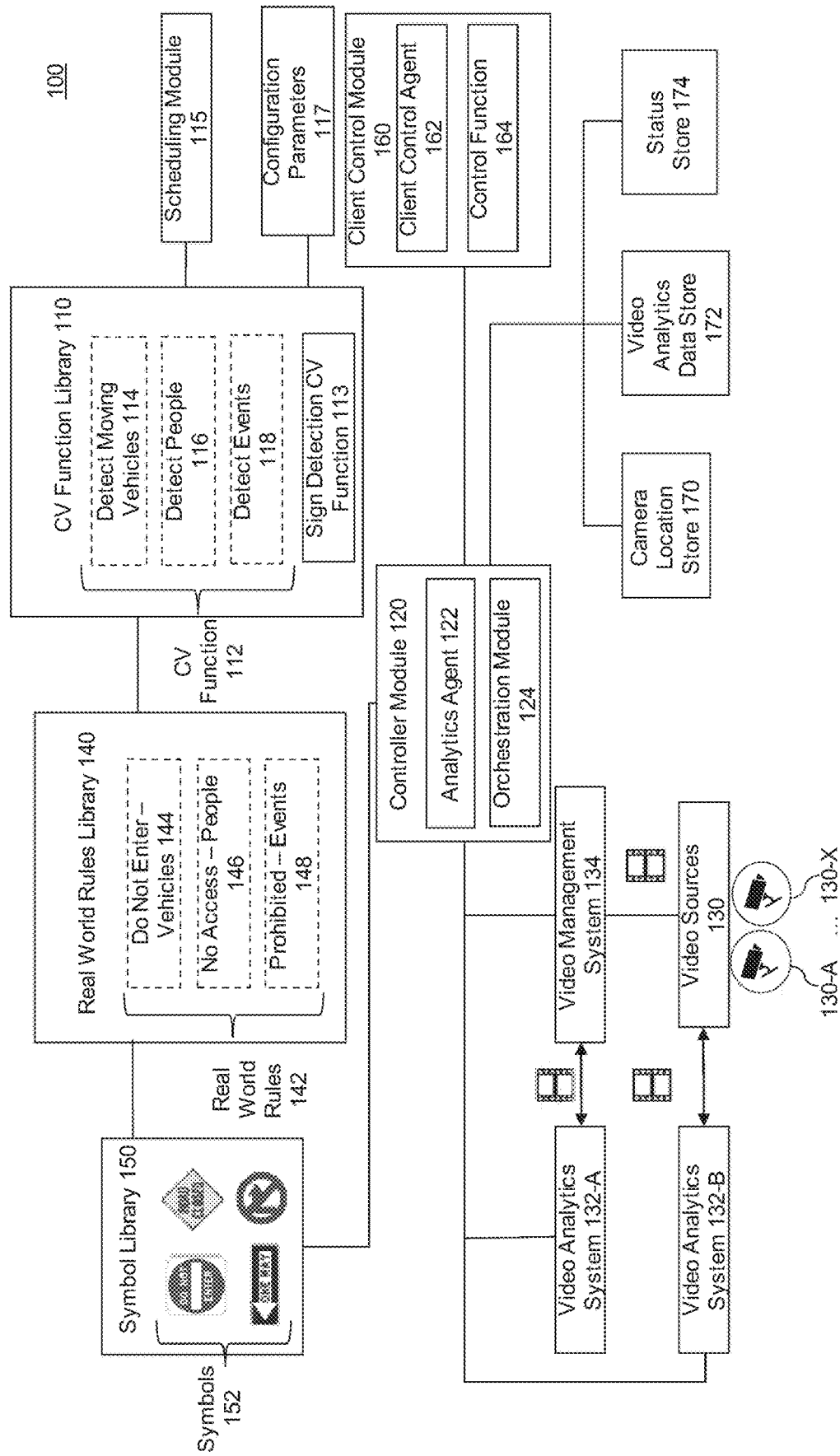
FIG. 1 illustrates a dynamic symbol-based system for objects-of-interest (OOI) video analytics detection, according to some embodiments.

The presented disclosure is described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

Video analytics systems use a variety of methods to detect objects-of-interest (OOI). In real world use cases, video analytics systems may be configured with a priori reference sets corresponding to computer vision (CV) functions for detecting OOI based upon an intended purpose or intended use context. However, the intended use context of an OOI model may quickly change and require dynamic implementation of CV functions to reflect the current intended use context. While video analytics systems have used CV functions to detect OOI, legacy video analytics systems face difficulty in dynamically implementing CV functions to reflect changing intended use contexts, especially in emergency contexts. Some embodiments include a system, method, and computer program product for improving the usability of video analytics systems through the use of symbols that may be applied to a graphical user interface representing a physical space or that may be inferred from physical signage where the sign is associated with a set of rules or instructions that invoke a relevant OOI model.

For example, a video analytics system may use a license plate analysis model to read license plate numbers and perform a database lookup to determine a particular vehicle registration. In this case, the intended purpose of the OOI model is to interpret alphanumeric information displayed on a license plate and utilize a derived alphanumeric string to query a database of license plate numbers to determine a partial or full match to known associated registration identity information.

On the other hand, a security station may use a facial recognition based video analytics system to determine the identity of visitors and perform a database lookup against a visitors' list. A CV function for detecting facial recognition OOI to detect license plate information would not be useful because the information derived from the CV function would be irrelevant to the intended use context of this specific OOI model. In this case, the intended use context of this OOI model generally is to monitor and detect the presence of a person or persons within an area closed to access. The CV function would then need to be designed to detect the presence of humans within a defined physical area. Accordingly, the video analytics system may establish a data representation of a visitor's face based upon various features captured in video frames and interpreting the data representation against other known representations in the security station associated with the visitor.

In these cases, the video analytics systems are using a priori reference sets or models to determine whether the detected OOI share the requisite number of features or traits of a particular OOI class model to be identified as a member of the relevant OOI class. Accordingly, video analytics systems can intelligently employ a particular OOI model based on the class of OOI to be detected. While legacy video analytics systems may use CV functions in particular intended use contexts, these legacy systems face challenges in dynamically deploying CV functions quickly based on changing intended use contexts.

Oftentimes, a video analytics system detecting OOI in dynamic environments may require a different OOI model to be implemented quickly. This is particularly the case in emergency response situations where the nature of the risk or threat condition, ground conditions, or known information of the emergency may rapidly change. In an emergency context, video analytics systems may benefit from deploying specific CV functions for OOI detection based upon changing intended use contexts. However, legacy video analytics systems do not easily allow for quickly implementing a desired CV function in a dynamic environment.

Some embodiments improve video analytics systems by dynamically inferring a symbol that represents signage or real world rules, and dynamically determining which CV functions for OOI detection represents the intended use context for a particular instance in changing environments. Symbols and signage generally denote an implicit or explicit set of rules in an environment. These symbols or signage may be used to represent an intended purpose of various OOI models in dynamic environments. By determining the intended purpose representing signage and real world rules, the relevant CV functions may be deployed in real-time and dynamically adjusted in emergency situations where the status of the signage and/or real world rules may quickly change.

FIG. 1 illustrates dynamic symbol-based system 100 for OOI video analytics detection, according to some embodiments. The system 100 may include CV function library 110. CV function library 110 may be a data store including one or more CV functions 112. CV function 112 may include one or more functions for detecting and processing OOI. CV function 112 may be dynamically parameterized to identify particular classes of OOI using various video analytics models with representative class data. For example, as shown in FIG. 1, CV function 112 can include one or more functions for detecting representative class data of OOI, including but not limited to the following functions to: detect moving vehicles 114, detect people 116, and/or detect events 118.

CV function 112 may include machine learning methods, such as decision trees, support vectors, and ensembles. CV function 112 may include neural networks, such as convolutional neural networks, feed forward and feedback neural networks, and recursive deep learning networks. CV function 112 may be used to determine the presence or absence of OOI within a statistically derived margin of error or certainty level. CV function 112 may perform simultaneous functions.

CV function library 110 may include sign detection CV function 113. Sign detection CV function 113 may be configured to monitor for signage in the physical world in the field of view of video sources. Sign detection CV function 113 may be configured to monitor for physical and/or electronic signs portraying text, symbols, shapes, or colors contained in the signage in the physical world. Sign detection CV function 113 may be configured to detect signage using textual recognition and object detection techniques. The textual recognition and object detection techniques include, but are not limited to, interpreting observable signs or messages within the field of view of video sources.

The system 100 may include one or more video analytics systems 132 (e.g., 132-A, 132-B). Video analytics system 132-A may execute CV function 112 and/or sign detection CV function 113. Video analytics system 132-A may be coupled to a graphical user interface (GUI). Video analytics system 132-A may be a sensor system that executes sign detection CV function 113 to detect signage in the physical world and/or CV function 112 to detect a representative class of OOI. Video analytics system 132-A may process CV function 112 and/or sign detection CV function 113 from video sources 130 (e.g., 130-A, . . . , 130-X). Video analytics system 132-A may process sign detection CV function 113 and/or CV function 112 within a designated physical or logical domain defined by the field of view or definition of video sources 130. Video analytics system 132-A may transmit video analytics data to video management system 134. Video management system 134 may be a data store for storing video analytics data received from video analytics system 132-A. Video management system 134 may process, manage, and/or analyze video analytics data received from video analytics system 132-A.

The system 100 may include controller module 120. Controller module 120 may include analytics agent 122 and/or orchestration module 124. Analytics agent 122 may instantiate CV function 112 used to detect OOI and/or sign detection CV function 113 for detecting signage from CV function library 110. Orchestration module 124 may determine the video sources 130 used to process sign detection CV function 113 and/or CV function 112.

Analytics agent 122 and/or orchestration module 124 may be functions of controller module 120 (e.g., an artificial intelligence construct or a machine agent.) For example, analytics agent 122 may receive input or a notification to instantiate CV function 112. The notification may be received from video analytics system 132-A, video management system 134, a client control module 160, and/or controller module 120 (e.g., via a selection of an item from one or more GUIs.) For example, video sources 130 may include video cameras configured to detect one or more signs (e.g., a recently added electronic road sign) and send a notification to controller module 120 via video analytics system 132-A.

Controller module 120 may receive a message or instruction from another system, such as an alerting or notification system (e.g., video analytics system 132 (e.g., 132-A), video management system 134, a client control module 160, and/or a GUI coupled to controller module 120), as to the instantiation of real world rule 142. In some embodiments, the message can be received via one or more networks (not shown). The system 100 may include real world rules library 140. Real world rules library 140 may be a data store including objects representing real world rule 142 for a particular class of OOI.

The system 100 may include a symbol library 150. Symbol library 150 may be a data store including one or more symbols 152. Symbol library 150 may store a symbol ID corresponding to symbol 152. In some embodiments, symbol library 150 may be a library displaying symbol 152 on a client GUI coupled to client control module 160. Symbol 152 may include, but is not limited to, icons, pictographs, text, images, colors, shapes, sounds or signals. Symbol 152 may be associated with real world rule 142 in the real world rules library 140. A symbol ID may correspond to an object of real world rule 142 in real world rules library 140 based on an intended purpose.

Analytics agent 122 may determine which CV function 112 controller module 120 may transmit to video analytics system 132-A. In some embodiments, analytics agent 122 transmits instructions to video analytics system 132-A to implement the instantiated CV function 112 to enable video analytics system 132-A to dynamically detect OOI within the field of view of video sources 130. Analytics agent 122 may dynamically select CV function 112 based upon the symbol 152 associated with real world rule 142 representing the intended purpose.

Based on the input and/or notification received, analytics agent 122 may determine which CV function 112 the video analytics system 132-A may process based upon the instantiation of symbol 152. Analytics agent 122 may associate an instantiated symbol 152 with real world rule 142 representing an intended purpose of the OOI model based on the real world interpretation of symbol 152. Real world rule 142 may include, but are not limited to, prohibitions, instructions, directives, requests, advice, alerts, warnings, or notices, which may be detected, observed, inferred, or interpreted by a machine agent or a human in the physical world. Real world rule 142 may include, but is not limited to, traffic alerts, intended purpose of signage (e.g., intended purpose of highway signage, intended purpose of mobile electronic signage), lockdown notifications, and chemical, biological, or other hazard warnings.

For example, as shown in FIG. 1, real world rules library 140 includes a real world rule, do not enter—vehicles 144. This rule may reflect a rule in the real world that a road or highway closure has occurred and vehicles may not enter the area. Real world rules library 140 also contains a real world rule, no access—people 146, which may be a rule reflecting that unauthorized persons may not enter a certain area. In another example, the real world rules library 140 contains a real world rule, prohibited—events 148, which may be a rule indicating that a certain events (e.g., illegal activity or risky conditions) are prohibited from occurring.

The system 100 may include a client control module 160. In some embodiments, the client control module 160 may cause instantiation of symbol 152. Client control module 160 may include client control agent 162 and/or control function 164. Client control agent 162 and/or control function 164 may be functions of client control module 160. Client control module 160 may be coupled to a client GUI. Client control agent 162 may instantiate symbol 152. Client control agent 162 may instantiate symbol 152 through any means of control, including, but not limited to, a GUI software selection control, a voice command, gesture, or any variation of interaction with a computer interface known to a person of ordinary skill in the art.

Client control agent 162 may determine which symbol 152 to select based on a corresponding real world rule 142 representing an intended purpose. Control function 164 may enable client control agent 162 to select symbol 152 on or accessibly from a graphical user interface. Control function 164 may include functions to instantiate symbol 152 including, but not limited to, dragging and dropping symbol 152, situating and displaying symbol 152 on a map, or associating location coordinates or address parameters to symbol 152 based on a location reference system. The client control module 160 may include an interface displaying a representation of a physical space, including, but not limited to, a map, floor plan, or other diagram representing a physical space. Symbol 152 may be instantiated when the client control agent 162 performs control function 164 in client control module 160.

In some embodiments, client control agent 162 may instantiate an area of interest from which video analytics system 132-A may process CV function 112. The area of interest may represent the area in which video sources may detect OOI. The area of interest may be coordinates forming lines or shapes within a closed boundary. The coordinates forming the lines or area of the shape may include a set of all points on the lines or within the area of the shape. The area of interest may be displayed on the representation of the physical space in the client GUI of client control module 160.

In some embodiments, controller module 120 may use video analytics data received from video analytics system 132-A to instantiate symbol 152. For example, video sources 130 may transmit video analytics data that includes new signage (e.g., a portable electronic signage) to video analytics system 132-A. In some embodiments, controller module 120 may transmit sign detection CV function 113 stored in CV function library 110 to video analytics system 132-A. Video sources 130 and/or video analytics system 132-A may perform sign detection CV function 113. Sign detection CV function 113 may be configured to interpret an observable sign and/or message within the field of view of video sources 130 to detect text, words, or symbols contained within signage in the physical world.

Upon detection of signage in the physical world, video analytics system 132-A may store video analytics data obtained from processing sign detection CV function 113 in the video analytics data store 172. Video analytics data related to the signage in the real world may include, but are not limited to, the approximate coordinates of the signage, the nature and purpose of the type of signage being displayed in the real world, text in the sign, shape of the sign, color of the sign, and other information relevant to determining the intended purpose of the signage.

Video analytics system 132-A may transmit video analytics data obtained from processing sign detection CV function 113 to controller module 120. Controller module 120 may receive video analytics data from video analytics system 132-A. Analytics agent 122 may use the video analytics data received from video analytics system 132-A to instantiate symbol 152. If analytics agent 122 determines characteristics of signage represented in the video analytics data approximately matches the characteristics of a particular symbol 152 in symbol library 150, analytics agent 122 may instantiate the symbol 152 matching the characteristics of the signage. In some embodiments, symbol 152 may be designated a symbol ID. Controller module 120 may relate a designated symbol ID to real world rule 142 that corresponds to the intended purpose of the signage or received notification in the physical world.

In some embodiments, controller module 120 may instantiate an area of interest based upon video analytics data received from video analytics system 132-A related to referential objects surrounding the coordinates of the detected signage. Sign detection CV function 113 may be configured to correlate one or more coordinates defining an area of interest to one or more observably distinct reference points, features, or objects within the field of view of video sources 130 ("referential objects"). Video analytics system 132-A may execute sign detection CV function 113 to detect referential objects. Sign detection CV function 113 may be configured to determine referential objects such as distinct reference points, including, but not limited to, a physical location in space, an angle of incidence, and/or a physical direction to establish an area of interest. Video analytics system 132-A can store video analytics data, such as the coordinates of the referential objects, in the video analytics data store 172. Video analytics system 132-A may transmit the video analytics data containing the referential objects to controller module 120 to establish an area of interest. Controller module 120 may instantiate an area of interest for processing CV function 112 based on the video analytics data received from video analytics system 132-A.

Upon instantiating symbol 152 and the area of interest, analytics agent 122 may determine the CV function 112 used to detect OOI based upon the symbol 152 associated with real world rule 142 that represents an intended use context of an OOI model and intended purpose of signage in the physical world.

Orchestration module 124 may determine the video sources 130 that provide video data to be processed by CV function 112 based on the location of video sources 130 in proximity to the instantiated area of interest. For example, the location of symbol 152 and area of interest may be compared with the location of video sources 130 by performing a query of a list of cameras and associated location information in the camera location store 170. In some embodiments, coordinates of instantiated symbol 152 may be stored in video analytics data store 172. Orchestration module 124 may compare the associated camera location information stored in the camera location store 170 to the video analytics data received from video analytics system 132-A containing the location of instantiated symbol 152 and area of interest stored in the video analytics data store 172.

The analytics agent 122 can select a CV function 112 for detecting the relevant OOI model, and the orchestration module 124 can select the video sources 130 from which the CV function 112 will be processed. Subsequently, controller module 120 may transmit instructions based upon the selected CV function 112 and selected video sources 130 to the video analytics system 132-A. In response to receiving instructions from controller module 120, video analytics system 132-A may execute the CV function 112 and process the CV function 112 selected by analytics agent 122 from the video sources 130 selected by orchestration module 124. Video analytics system 132-A may configure the received CV function 112 with configuration parameters 117. The configuration parameters 117 may include, but are not limited to, instructions, parameters, configurations, settings rules, or inputs. The configuration parameters 117 may be pre-determined. The configuration parameters 117 may enable the detection of OOI within from video sources 130 for a particular instance. CV function 112 may perform functions in a prescribed order determined by the set of configuration parameters 117. In the case of dynamic environments or emergency contexts, video analytics system 132-A may change the settings for the class of OOI to be detected by applying configuration parameters 117. In some embodiments, analytics agent 122 may apply configuration parameters to CV function 112.

Controller module 120 may communicate with scheduling module 115. Scheduling module 115 may instantiate symbol 152 according to pre-established dates and times. Scheduling module 115 may prescribe a period or duration in which an associated CV function 112 may execute. Controller module 120 may transmit instructions related to CV function 112 to video analytics system 132-A based upon information related to the period or duration configured within scheduling module 115.

After instantiation of symbol 152 and/or the area of interest, controller module 120 may transmit a notification to one or more devices in proximity to coordinates of instantiated symbol 152 and/or the area of interest. The notification may include, but is not limited to, displaying symbol 152 and/or the area of interest on the representation of the physical space displayed on the GUI of the device receiving the notification. The notification may be transmitted based upon proximity of the device to the coordinates of the area of interest and/or signage in the physical world stored contained in the video analytics data received from video analytics system 132-A and/or the coordinates of instantiated symbol 152 and/or the instantiated area of interest in client control module 160.

Controller module 120 may communicate with a status store 174. The status store 174 may be a data store that describes the status of an instantiated symbol 152 and/or instantiated area of interest. The status of instantiated symbol 152 and/or instantiated area of interest may include, but is not limited to, being activated, deactivated, suspended in relation to the selected CV function 112. According to some embodiments, in the case the status of instantiated symbol 152 and/or instantiated area of interest has changed, controller module 120 may transmit an instruction to the video analytics system 132-A that the status of instantiated symbol 152 has changed. Controller module 120 may send a request to video analytics system 132-A to activate and execute the associated CV function 112, terminate performing CV function 112, suspend performing CV function 112 until a condition is fulfilled, or change an associated CV function 112 to correspond with the updated state of instantiated symbol 152. Video analytics system 132-A may execute commands based on the instructions from controller module 120 related to the change to the instantiated symbol 152 and/or instantiated area of interest.

The CV function library 110, real world rules library 140, symbol library 150, camera location store 170, video analytics data store 172, status store 174, and/or video management system 134 may each be a data store ("the data stores"). The data stores may be a relational database, a NoSQL database or other horizontally scaling database, or any other database adhering to a suitable database design methodology. In an embodiment, the data store may implement a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, the data store may deploy a hard-disk interface, such as ATA, SATA, SCSI, SAS, and/or fibre for interfacing with storage mediums.

Video analytics system 132-A, controller module 120, client control module 160, and video management system 134 may be co-located within one system, combined into one system, or exist within separate systems.

In some embodiments, video analytics system 132-A may use sign detection CV function 113 to detect physical and electronic signage in the real world. Sign detection CV function 113 may be an analytics tool configured to retrieve video analytics data from electronic and physical signage in a manner distinguishable from legacy video analytics tools. Sign detection CV function 113 may be configured to detect attributes of signage that signal to video sources 130 that physical or electronic signage has been modified or physically deployed in the real world. Video analytics system 132-A may configure sign detection CV function 113 to specifically detect attributes generally representative of physical and electronic signage in the real world (e.g., color, icons, lines, text, shapes) using object detection and text recognition techniques. Additionally, sign detection CV function 113 may be configured to detect referential objects in proximity to detected physical or electronic signage. After detecting physical and electronic signage and referential objects in the real world, video analytics system 132-A may transmit the video analytics data to controller module 120. Controller module 120 may store the video analytics data in the video analytics data store 172.

In some embodiments, controller module 120 may be an analytical tool configured to query symbol library 150 by mapping video analytics data stored in video analytics data store 172 to a particular symbol 152. Symbol library 150 may store a symbol ID corresponding to each symbol 152. The symbol ID may correspond to a query tuple that represents various attributes for a particular symbol 152. For example, each symbol 152 may have certain attributes generally representative of physical and electronic signage in the real world (e.g., color, icons, lines, texts, shapes). Therefore, each symbol 152 may have a unique query tuple containing values corresponding to attributes representing symbol 152. Controller module 120 may map the video analytics data for each physical and electronic sign detected in the real world to the query tuples for a symbol 152 with the same or similar attributes.

Accordingly, analytics agent 122 may determine the CV function 112 based on the symbol 152 controller module 120 selected from mapping the query tuples of symbol 152 to video analytics data representing the physical or electronic signage detected in the real world. Some embodiments enable the mapping of video analytics data retrieved from a distinctive sign detection CV function 113 to query tuples representing a particular symbol 152 stored in symbol library 150. In some embodiments, orchestration module 124 may use the coordinates of the physical and electronic signage and/or referential objects in the real world to determine an area of interest. Orchestration module 124 may determine the video sources 130 from which to execute CV function 112.

In some embodiments, controller module 120 may be an analytic tool using an instantiated symbol 152 and referential objects to select a relevant CV function 112. Client control module 160 may instantiate a particular symbol 152 on a client graphical user interface. Client control module 160 may also determine an area of interest to determine the video sources 130 from which the selected CV function 112 may be executed. The instantiated symbol 152 corresponds to a symbol 152 object stored in symbol library 150. Client control module 160 may transmit the instantiated symbol 152 and area of interest to controller module 120. Moreover, client control module 160 may remove, modify, and/or add a new symbol 152 as the circumstances and status of the instantiated symbol 152 changes. Therefore, controller module 120 may dynamically change CV function 112 based on the changing inputs received from client control module 160 in relation to instantiated symbol 152 and the area of interest. Accordingly, dynamically adjusting the status of instantiated symbol 152 and the area of interest improves video analytics tools and emergency operations.

Figure 2:
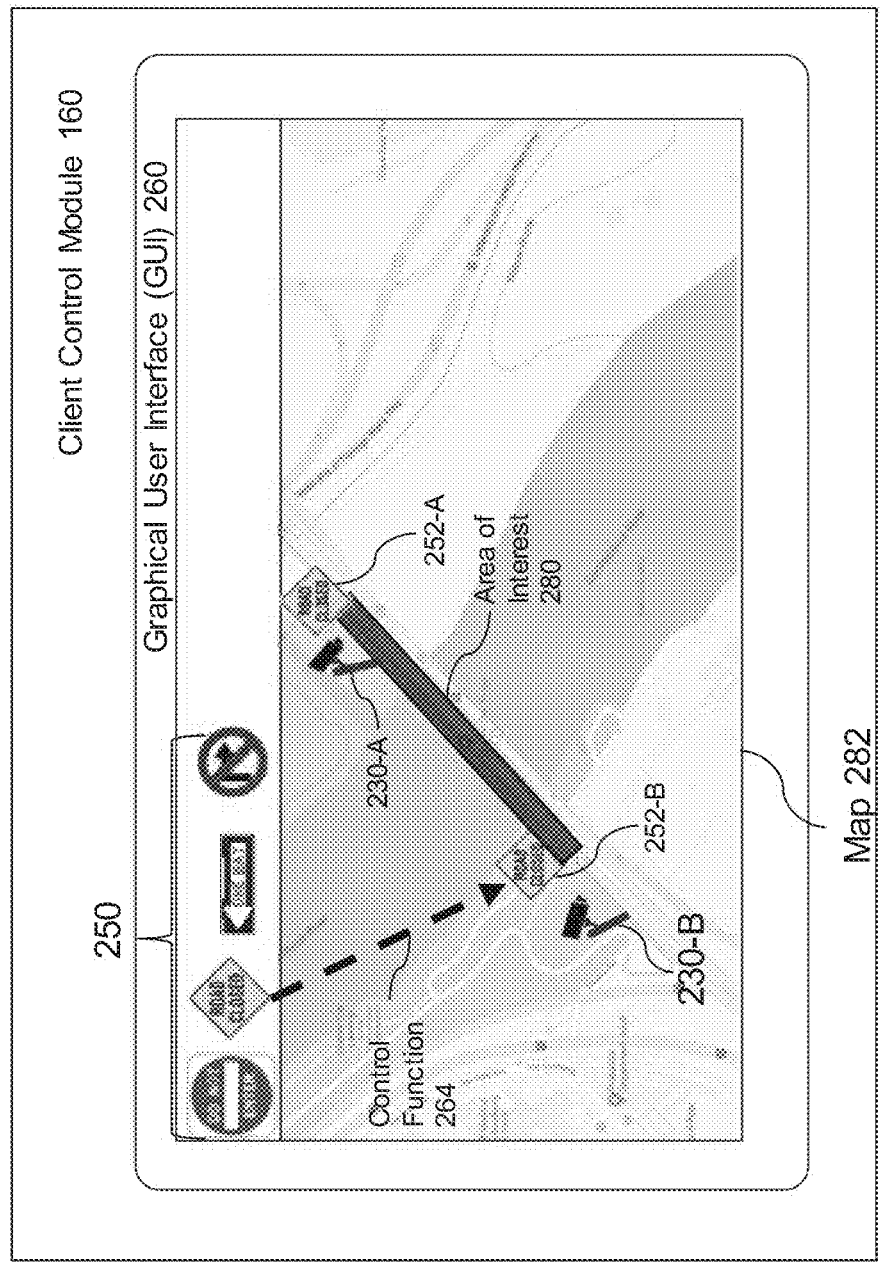
FIG. 2 illustrates an example of instantiating a symbol representing an intended purpose associated with a real world rule, according to some embodiments.

FIG. 2 illustrates example 200 of instantiating symbol 152 representing an intended purpose associated with real world rule 142, according to some embodiments. As a convenience and not a limitation, FIG. 2 may be described with reference to elements of FIG. 1. For example, graphical user interface (GUI) 260 can be coupled to client control module 160 of FIG. 1. Generally, legacy systems face difficulty in invoking an OOI model for a particular intended purpose in dynamic environments. Accordingly, there is a need to use symbols associated with real world rules to improve the usability of video analytics systems in dynamic environments. To address this problem, symbol 152 representing a particular intended purpose may be instantiated to deploy a relevant CV function 112 in dynamic environments. To illustrate how to deploy a particular CV function 112 corresponding to instantiated symbol 152, an example is provided illustrating the use of symbol-based rules when faced with a closure of a two-way street to vehicular traffic.

In some embodiments, client control module 160 may receive a notification from an alerting system that a particular two-way street to vehicle traffic has been closed. Client control agent 162 may determine the intended purpose of this notification is to detect whether there are moving vehicles entering the closed two-way street. In some embodiments, client control agent 162 may instantiate symbol 152 associated with real world rule 142 in client control module 160. Based on this particular intended purpose of the notification, client control agent 162 may select the symbol 152 associated with the real world rule 142 representing the intended purpose in client control module 160.

Client control agent 162 may select symbol 152 from a client GUI 260 coupled to the client control module 160. The client GUI 260 may include a map 282 representing a physical space in which CV function 112 may be processed, according to some embodiments. Client control agent 162 may select a symbol 152 from symbol library 250 displayed in the client GUI 260 of the client control module 160. The symbols in symbol library 250 may be correspond to a symbol ID stored in a data store. The symbol ID may be associated with real world rule 142 stored in the real world rules library 140.

Symbols or signage generally denote an implicit or explicit set of rules in an environment. For example, a sign or symbol containing text stating "Road Closed" represents the explicit or implicit rule that vehicles may not enter the closed road. Accordingly, the "Road Closed" symbol icon may correspond to a symbol ID that associates with a real world rule 142 object stored in real world library 140 representing the real world rule do not enter—vehicles 144.

Upon determining the intended purpose is to restrict moving vehicles from entering the road closure, client control agent 162 (e.g., a user may utilize GUI 260 and) may choose the diamond-shaped symbol containing text stating "Road Closed" associated with the real world rule do not enter—vehicles 144 to represent the intended purpose. Client control agent 162 may employ various control functions 264 on the client GUI 260 of client control module 160. Client control agent 162 may be utilized to drag and drop a selected symbol 152 from symbol library 250 within the map 282 displayed on the client GUI 260 of client control module 160.

As shown in example 200 the user, via client control agent 162, dragged and dropped two road closure symbols, symbol 252-A and symbol 252-B, from symbol library 250 to the map 282 displayed on the client GUI 260 of the client control module 160 to indicate there is a road closure on a two-way street. By dragging and dropping the two "Road Closed" symbols, the client control agent 162 has instantiated symbol 252-A and symbol 252-B, to the particular two-way street road closure associated with the real world rule do not enter—vehicles 144.

After instantiating symbol 252-A and symbol 252-B, client control agent 162 may then select an area of interest 280 to determine which area of the GUI 260 to process CV function 112 from video sources 130. Client control agent 162 may define the shape or boundary defining the area of interest 280 in which the shape's boundaries may be correlated to the coordinate system of the map 282. Accordingly, client control agent 162 may determine an area of interest 280 around the two-way street demarcating a rectangular object surrounding the closed two-way street. By demarcating the area of interest onto the map 282 in the GUI 260, client control agent 162 has instantiated the area of interest. Client control module 160 may transmit data containing instantiated symbol 152 and instantiated area of interest to controller module 120.

In some embodiments, analytics agent 122 may instantiate symbol 152 associated with real world rule 142 representing the intended purpose by detecting signage in the environment. In this case, two "Road Closed" signs may be physically deployed in the physical world. The two "Road Closed" signs may be present within the fields of view of video source 230-A and video source 230-B. Video analytics system 132-A may execute sign detection CV function 113 that utilizes textual recognition techniques or object detection techniques to interpret signage in the physical world. In this case, video analytics system 132-A processing sign detection CV function 113 may have detected the "Road Closed" sign by processing the video data of the signs within the field of view of the video source 230-A and video source 230-B.

Video analytics system 132-A may store characteristics of the "Road Closed" sign situated in the physical world in the video analytics data store 172, such as the shape of the signage, color of the signage, text contained within the signage, and other relevant information of the signage representing the intended purpose. Video analytics system 132-A may transmit video analytics data to controller module 120. Analytics agent 122 may use the video analytics data received from video analytics system 132-A to query symbol library 250 and associate "Road Closed" symbol 252-A and symbol 252-B with the "Road Closed" signs physically deployed in the two-way street. Analytics agent 122 may correlate the attributes of the signage in the physical world contained within the video analytics data, such as the color, shape, text, and icons within the signage, to characteristics of symbols in symbol library 250. Based on the matching characteristics of the "Road Closed" signs situated in the physical world and symbol 252-A and symbol 252-B in symbol library 250, analytics agent 122 may instantiate symbol 252-A and symbol 252-B.

In some embodiments, video analytics system 132-A may execute sign detection CV function 113 from CV function library 110 to define an area of interest 280. Video analytics system 132-A may use the known coordinates of the signage detected in the fields of view of video sources 130 to detect referential objects. The referential objects may include the physical location in space, angle on incidence, and physical direction in relation to the detected signage. Video analytics system 132-A may store video analytics data related referential objects situated in the physical world in the video analytics data store 172, such as the coordinates of the referential objects. Using these referential objects, video analytics system 132-A may determine the shape or boundary of the area of interest. Video analytics system 132-A may correlate the coordinates of the referential objects within the field of view of video sources 130 to determine the location points of the area of interest 280.

Figure 3:
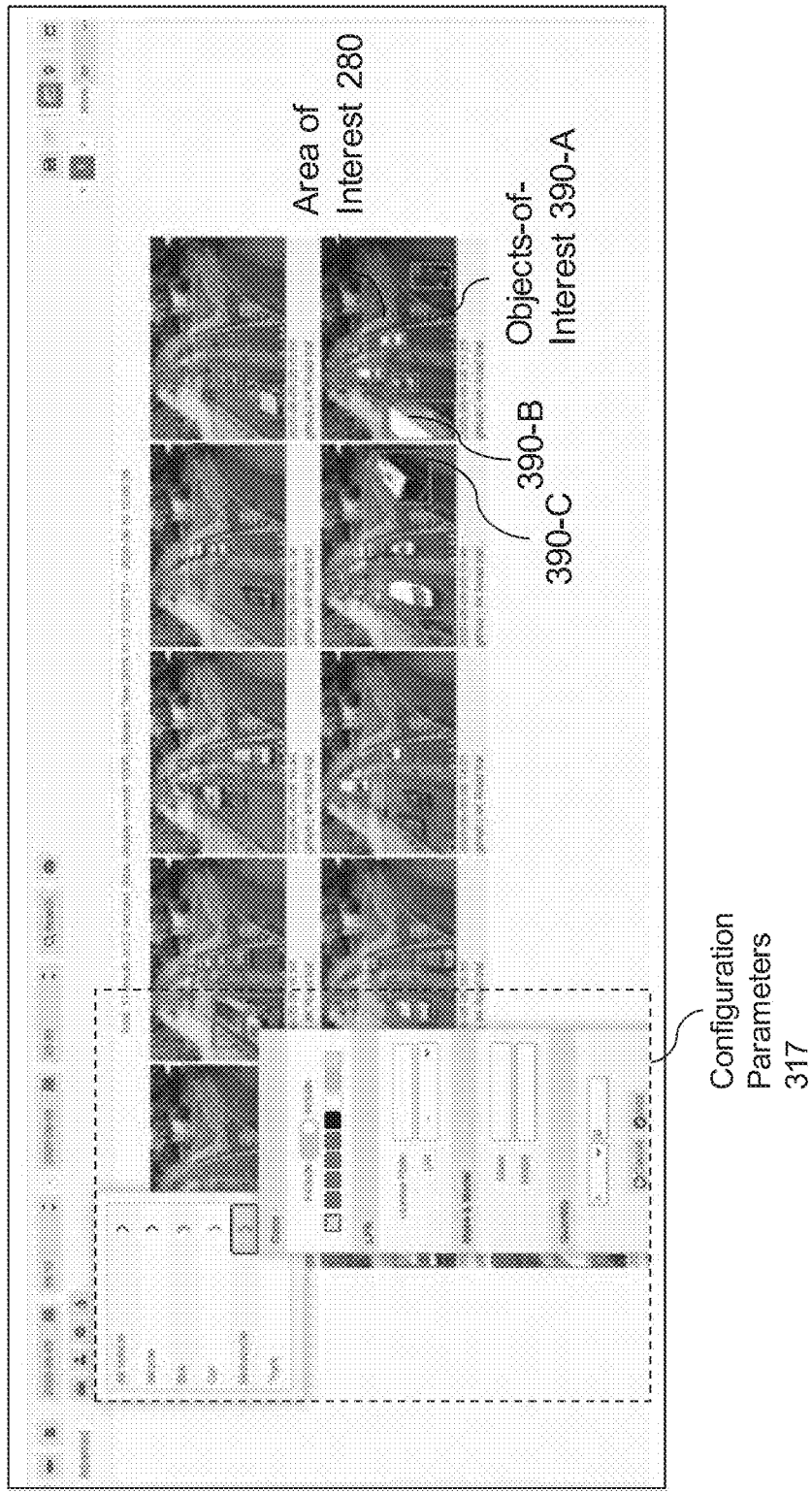
FIG. 3 illustrates an example of a video analytics system of a dynamic symbol-based system for OOI video analytics detection, according to some embodiments.

FIG. 3 illustrates example 300 of a video analytics system of a dynamic symbol-based system for OOI video analytics detection, according to some embodiments. As a convenience and not a limitation, FIG. 3 may be described with reference to elements of FIGS. 1 and/or 2. For example, example 300 may be a GUI of video analytics system 132A of FIG. 1 that depicts area of interest 280 of FIG. 2. After instantiation of the symbol 252-A and symbol 252-B and the area of interest 280, analytics agent 122 may determine the CV function 112 that should be executed based on the instantiated symbols 252-A and symbol 252-B. The "Road Closed" symbol 252-A and symbol 252-B may correspond to symbol IDs associated with the CV function configured to detect moving vehicles 114 as its intended purpose. CV function detect moving vehicles 114 contributes to accomplishing the intended purpose of restricting moving vehicles from entering a road closure by detecting any moving vehicles in violation of the prohibition of the real world rule do not enter—vehicles 144.

Upon selecting the CV function 112 for detecting the relevant OOI, orchestration module 124 may determine the video sources 130 from which CV function detect moving vehicles 114 may be processed. Orchestration module 124 may determine that the area in which CV function detect moving vehicles 114 may be processed may be the instantiated area of interest 280. Orchestration module 124 may compare coordinates of the symbol 252-A and symbol 252-B and the area of interest 280 contained in the video analytics data received from video analytics system 132-A and coordinates of video sources stored in the camera location store 170 to determine which video sources 130 will be used to process CV function 112.

After determining CV function detect moving vehicles 114 will be used to detect OOI based on the intended purpose and video sources 130 used to process the CV function detect moving vehicles 114, controller module 120 may transmit instructions related to the video sources 130 and CV function detect moving vehicles 114 to video analytics system 132-A. Video analytics system 132-A may execute CV function detect moving vehicles 114 to detect moving vehicles as the representative class of OOI. Video analytics system 132-A may include the video analytics system GUI of example 300. Example 300 may display the video data from the selected video sources 130 and the objects-of-interest 390 (e.g., 390-A, 390-B, 390-C, . . . ) detected within the field of view of video source 230-A and video source 230-B.

Video analytics system 132-A may use configuration parameters 117 to adapt CV function detect moving vehicles 114 to the particular instance of the two-way road closure. For example, CV function detect moving vehicles 114 may be configured to detect any moving vehicles entering the two-way road closure. Video analytics system 132-A may continue to execute CV function detect moving vehicles 114 to detect any vehicles. However, the environment may suddenly change and a vehicle may enter the road closure. In that case, it may be useful to refine CV function detect moving vehicles 114 further. For example, video analytics system 132-A may have detected a motorcycle as OOI in violation of the real world rule do not enter—vehicles 144. As highlighted in FIG. 3, video analytics system 132-A may then refine the configuration parameters 317 in the video analytics system 132-A to only detect motorcycles, and/or a particular license plate, make, or model.

Figure 4:
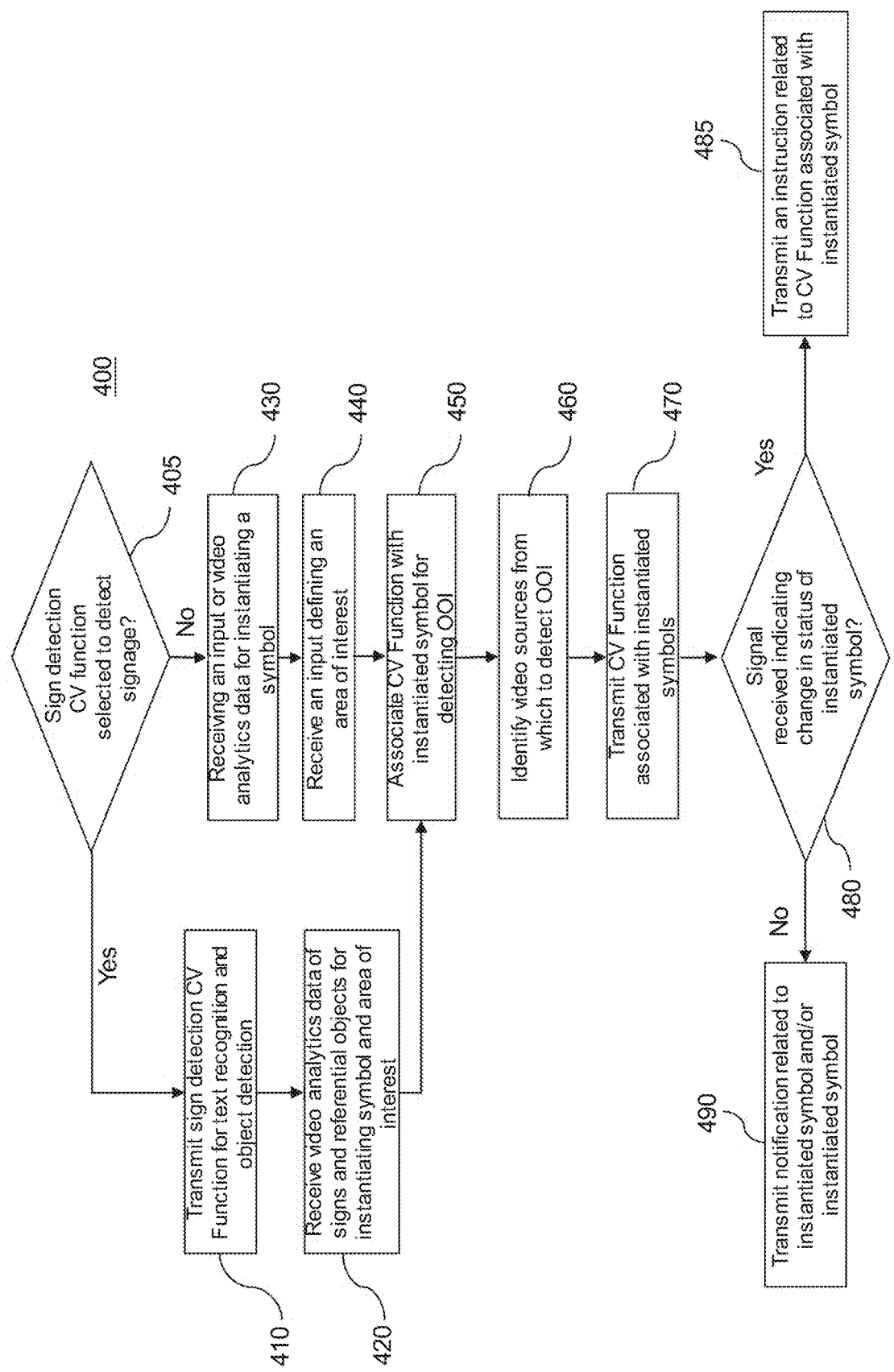
FIG. 4 illustrates an example of a method for a dynamic symbol-based system for OOI video analytics detection, according to some embodiments.

FIG. 4 illustrates an example method 400 for a dynamic symbol-based system for OOI video analytics detection, according to some embodiments. As a convenience and not a limitation, FIG. 4 may be described with reference to elements of FIG. 1, FIG. 2, and FIG. 3. For example, method 400 may be performed by controller module 120 of FIG. 1. In some embodiments, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 405, controller module 120 (e.g., analytics agent 122) determines whether to select a sign detection CV function 113 from CV function library 110 to be processed by video analytics system 132-A. Sign detection CV function 113 may be used to detect objects using textual recognition and object detection techniques. The textual recognition and object detection techniques include, but are not limited to, interpreting observable signs or messages within the field of view of video sources 130. When controller module 120 determines that a sign detection CV function 113 from CV function library 110 to be processed by video analytics system 132-A, method 400 proceeds to 410. When controller module 120 has not selected a sign detection CV function 113 from CV function library 110 to be processed by video analytics system 132-A, method 400 proceeds to 430.

At 410, controller module 120 may transmit one or more selected sign detection CV functions 113 to video analytics system 132-A. Controller module 120 may transmit the video sources 130 from which video analytics system 132-A may process the selected sign detection CV function 113.

At 420, controller module 120 may receive video analytics data of signage and referential objects in the field of view of video sources 130 for instantiating symbol 152 and an area of interest. For example, video analytics system 132-A may execute sign detection CV function 113 configured to monitor for signage in the physical world in the field of view of video sources 130. The signage may be physical or electronic signage portraying text, symbols, shapes, or colors representing an intended purpose. Upon detecting signage in the physical world, video analytics system 132-A may store video analytics data processed from executing sign detection CV function 113 in the video analytics data store 172. Video analytics data related to the signage in the real world may include, but are not limited to, the approximate coordinates of the signage, the nature and purpose of the type of signage being displayed in the physical world, text in the signage, shape of the signage, color of the signage, and other information relevant to determining the intended purpose of the signage.

Upon detecting and storing data related to signage in the physical world, video analytics system 132-A may also store video analytics data related to referential objects in the video analytics data store 172. Video analytics data related to referential objects may include, but are not limited to, coordinates of the referential objects, distinct reference points, the physical location in space, an angle of incidence, and/or physical direction to signage in the physical world. The referential objects may include objects within the field of view of video sources 130.

Controller module 120 may receive video analytics data processed from the sign detection CV function 113 for instantiating symbol 152. Video analytics system 132-A may transmit video analytics data obtained from processing sign detection CV function 113 to controller module 120. Controller module 120 may receive video analytics data from video analytics system 132-A. Based on defining characteristics of the signage in the physical world, analytics agent 122 may query symbol library 150 and/or the real world rules library 140 to instantiate symbol 152. Analytics agent 122 may use the video analytics data received from video analytics system 132-A to associate defining characteristics of the signage in the physical world to a particular symbol 152. These characteristics of the signage in the physical world may include, but are not limited to, the color, text, shape, or icon contained in the signage in the physical world.

If the characteristics of the signage in the video analytics data approximately matches the characteristics of a particular symbol 152 in symbol library 150, controller module 120 may instantiate the symbol 152 matching the characteristics of the signage. In some embodiments, symbol 152 will be associated with a symbol ID. Controller module 120 may relate symbol ID to the real world rule 142 that represents the intended purpose of the signage.

Controller module 120 may define the area of interest based on the video analytics data containing information related to the detected referential objects stored in the video analytics data store 172. Analytics agent 122 may correlate the coordinates of the referential objects within the field of view of video sources 130 to determine the location points of the area of interest. Method 400 proceeds to 450.

At 450, controller module 120 (e.g., analytics agent 122) may determine a CV function 112 associated with the instantiated symbol 152. Analytics agent 122 may select CV function 112 from the CV function library 110 that best represents the intended purpose. CV function 112 may be a method for detecting and processing OOI. CV function 112 may be interactively parameterized to identify particular classes of OOI using various video analytics models with representative class data. CV function 112 may include machine learning methods and neural networks. Analytics agent 122 may associate CV function 112 with the instantiated symbol 152 that corresponds to the real world rule 142 representing the intended purpose.

At 460, controller module (e.g., orchestration module 124) may identify the video sources 130 from which video analytics system 132-A will process the selected CV function 112. Orchestration module 124 may determine the video sources 130 from which the CV function 112 will be processed. Orchestration module 124 may limit the video sources 130 from which the CV function 112 will be processed to the instantiated area of interest. Orchestration module 124 may also use video analytics data received from video analytics system 132-A containing the coordinates of instantiated symbol 152 and the area of interest to determine which video sources 130 to process.

At 470, controller module 120 may transmit the selected CV function 112 to video analytics system 132-A. Controller module 120 may also use scheduling module 115 to prescribe a period or duration in which controller module 120 may transmit an associated CV function 112 to the video analytics system 132-A.

At 480, controller module 120 determines whether an input based upon a change to the status of instantiated symbol 152 is received. Controller module 120 may include a status store 174, which may be a data store that describes the status of instantiated symbol 152. The status of instantiated symbol 152 may include, but is not limited to, being activated, deactivated, suspended in relation to an associated CV function 112. If the controller module 120 received no change to the status of instantiated symbol 152, method 400 proceeds to 490. If controller module 120 received an input indicating a change in the status store 174 to the status of symbol 152, the method 400 proceeds to 485.

At 485, controller module 120 may transmit an instruction related to the CV function 112 associated with symbol 152. In the case the status of symbol 152 has changed, controller module 120 may transmit an instruction to the video analytics system 132-A that the status of symbol 152 has changed. Controller module 120 may send a request to video analytics system 132-A to activate and run the selected CV function 112, terminate performing CV function 112, suspend performing CV function 112 until a condition is fulfilled, or change an associated CV function 112 to correspond with the updated state of symbol 152.

At 490, controller module 120 may transmit a notification of the instantiated symbol 152 and area of interest to a device. The notification may include, but is not limited to, displaying the instantiated symbol 152 on the representation of the physical space displayed on the user interface of the device. Analytics agent 122 may use the geographic coordinates of the device to determine the proximity of the device to the coordinates of the signage in the physical world. Based on this information, controller module 120 may transmit the notification based upon proximity of the device to the physical location associated with instantiated symbol 152 and/or the area of interest.

Returning to 430, where controller module 120 did not select a sign detection CV function 113 from CV function library 110 to be processed by video analytics system 132-A, controller module 120 may receive an input based upon the instantiation of symbol 152 associated with real world rule 142. Controller module 120 may store real world rule 142 in real world rules library 140. Real world rule 142 may include, but is not limited to, prohibitions, instructions, directives, requests, advice, warnings, or notices, which may be observed, understood, and/or interpreted in the physical world.

Controller module 120 may receive an input associated with a real world rule 142 representing an intended purpose. The intended purpose may be represented by real world rule 142. Controller module 120 may receive an input or notification as to the instantiation of real world rule 142 from client control module 160.

In some embodiments, client control module 160 may receive a notification from an alerting system as to the instantiation of a real world rule 142. The received input may be a notification or instruction from another system, such as an alerting or notification system, including, but not limited to, traffic alerts, highway sign messaging systems, lockdown notifications, chemical, biological or other hazard warnings. Client control agent 162 may determine the intended purpose of this notification. In some embodiments, client control agent 162 may instantiate symbol 152 associated with real world rule 142 in client control module 160. Based on this particular intended purpose of the notification, client control agent 162 may select the symbol 152 associated with the real world rule 142 representing the intended purpose in client control module 160.

Client control agent 162 may use control function 164 to select symbol 152 on or accessibly from a client GUI coupled to the client control module 160. Control function 164 includes, but is not limited to, dragging and dropping symbol 152 on a client GUI, situating and displaying symbol 152 on a map, or associating location coordinates or address parameters to symbol 152 based on a location reference system. Client control module 160 may instantiate symbol 152 upon client control agent 162 performing a control function 164. Client control agent may enable the instantiation of symbol 152 through any means of control, including, but not limited to, a GUI software selection control, a voice command, gesture, or any variation of interaction with a computer interface known to a person of ordinary skill in the art.

At 440, controller module 120 may receive an input based upon the instantiation of an area of interest. The client control agent may determine an area of interest that represents the area in which video analytics system 132-A processes CV function 112 to detect OOI. Client control agent 162 may define an area of interest based on the approximate coordinates of the area in which video analytics system 132-A processes CV function 112. Client control agent 162 may use control function 164 to represent the area of interest in the graphical user interface of the client control module 160. Method 400 proceeds to 450.

Figure 5:
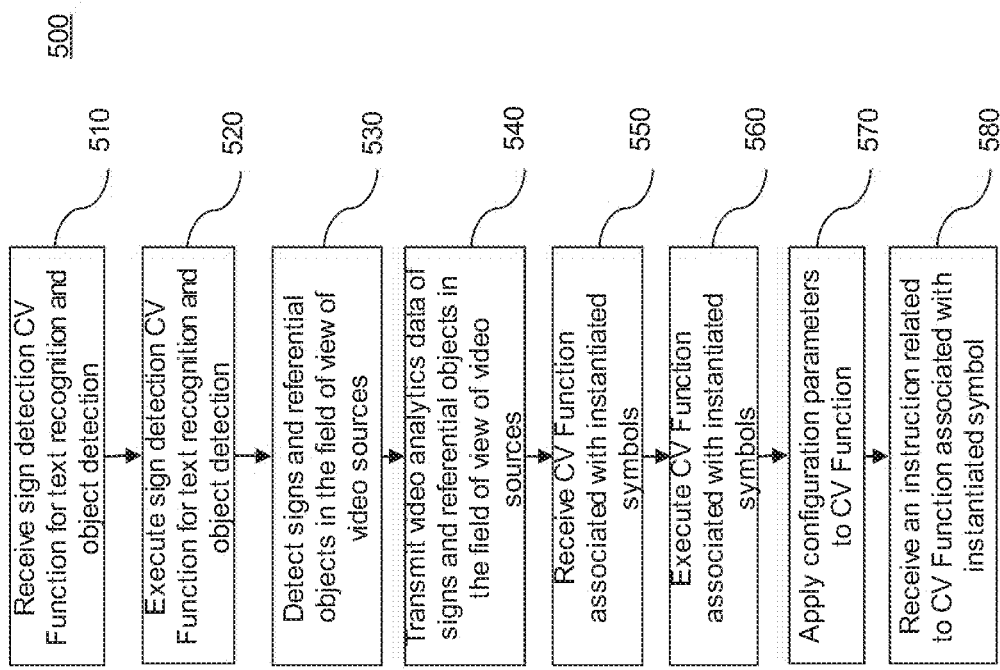
FIG. 5 illustrates an example of a method for a dynamic symbol-based system for OOI video analytics detection using a video analytics system, according to some embodiments.

FIG. 5 is an example of method 500 for a dynamic symbol-based system for OOI video analytics detection using a video analytics system, according to some embodiments. As a convenience and not a limitation, FIG. 5 may be described with elements of FIGS. 1-4. For example, method 500 may be performed by video analytics system 132A of FIG. 1. In some embodiments, method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 510, video analytics system 132-A may receive a sign detection CV function 113 from the controller module 120. Sign detection CV function 113 may be configured to detect objects using textual recognition and object detection techniques. The textual recognition and object detection techniques include, but are not limited to, interpreting observable signs or messages within the field of view of video sources 130. Video analytics system 132-A may receive information from controller module 120 related to the selected video sources 130 from which to process the sign detection CV function 113.

At 520, video analytics system 132-A may execute sign detection CV function 113. Video analytics system 132-A may execute sign detection CV function 113 from the selected video sources 130. Video analytics system 132-A may execute sign detection CV function 113 configured to monitor for signage in the physical world in the view of video sources 130. The sign may be a physical or electronic sign portraying text, symbols, shapes, or colors representing an intended purpose. Upon detecting signage in the physical world, video analytics system 132-A may store video analytics data processed from executing sign detection CV function 113.

At 530, video analytics system 132-A may detect signs in the field of view of video sources 130. In some embodiments, video analytics system 132-A may process video analytics data indicating the presence of signage in the physical world. Sign detection CV function 113 may be configured to detect when there is presence of signage that was previously absent in the physical world. In some embodiments, sign detection CV function 113 may be configured to detect a change to signage in the physical world. In some embodiments, electronic signage may transmit video analytics data to video analytics system 132-A indicating the presence of signage in the real world representing an intended purpose associated with a real world rule 142.

Sign detection CV function 113 may be configured to associate detected objects in the field of view of video sources 130 to objects in a data store containing data related to signs that represent a real world rule 142. Objects in a data store containing data related to signs representing a real world rule 142 may include characteristics of signs, such as, text, shape, color, or symbols. Sign detection CV function 113 may be configured to determine whether characteristics of detected objects in the field of view of video sources 130 approximately match the characteristics of signs in the data store containing data related to signs representing a real world rule 142. If the characteristics of an object in the data store match the detected object in the field of view of video sources 130, video analytics system 132-A may determine the presence of signage in the physical world. Video analytics system 132-A may store characteristics related to the detected sign in the field of view of video sources 130 in the video analytics data store 172.

At 540, video analytics system 132-A may detect referential objects in the field of view of video sources 130. Sign detection CV function 113 may be configured to detect referential objects surrounding the signage detected in the physical world. Video analytics system 132-A may use the coordinates of the signage in the physical world stored in video analytics data store 172 to determine referential objects in the surrounding area. Video analytics system 132-A may store the coordinates of the referential objects in the video analytics data store 172. Referential objects may include, but are not limited to, distinct reference points, the physical location in space, an angle of incidence, and physical direction to signage in the physical world. The referential objects may include objects within the field of view of video sources 130.

At 540, video analytics system 132-A may transmit video analytics data to the controller module 120. Video analytics system 132-A may transmit video analytics data stored in the video analytics data store to controller module 120. Video analytics data may include, but is not limited to, data related to the signs detected in the physical world, data related to the referential objects detected in the field of view of video sources 130, the coordinates of the signage and referential objects detected in the field of view of video sources 130, data related to the characteristics of the signage detected in the physical world, such as, color, text, shape, or symbols contained within the sign, and/or data transmitted from electronic signage.

At 550, video analytics system 132-A may receive CV function 112 from controller module 120 associated with instantiated symbol 152. Video analytics system 132-A may receive a CV function 112 from controller module 120 that best represents the intended purpose. CV function 112 may be a method for detecting and processing OOI. Video analytics system 132-A may receive more than one CV function 112 from controller module 120. CV function 112 may be interactively parameterized to identify particular classes of OOI using various video analytics models with representative class data. CV function 112 may include machine learning methods and neural networks.

At 560, video analytics system 132-A may execute the CV function 112 associated with instantiated symbol 152. Video analytics system 132-A may execute CV function 112 for detection of the class of OOI relevant to the intended purpose associated with real world rule 142. Video analytics system 132-A may include a video analytics system GUI. The video analytics system GUI coupled to the video analytics system 132-A may display video data from the selected video sources 130 and the OOI detected within the field of view of video sources 130. Video analytics system 132-A may transmit video analytics data obtained from processing CV function 112 to video management system 134. Video management system 134 may store, manage, and/or analyze the video analytics data received from video analytics system 132-A.

At 570, video analytics system 132-A may apply configuration parameters 117 to CV function 112. Video analytics system 132-A may use configuration parameters 117 to adapt CV function 112. Video analytics system 132-A may use configuration parameters 117 to narrow or broaden the particular class of OOI CV function 112 will monitor from video sources 130. In a dynamic environment, video analytics system 132-A may use configuration parameters 117 to change the class of OOI processed by CV function 122.

Configuration parameters 117 may include, but are not limited to, instructions, parameters, configurations, settings rules, or inputs. Configuration parameters 117 may be predetermined. Configuration parameters 117 may enable detection of OOI within video data (e.g., video feeds) from video sources 130 for a particular instance. CV function 112 may perform functions in a prescribed order determined by configuration parameters 117.

At 580, video analytics system 132-A may receive instructions from controller module 120 related to CV function 112. The instructions may include, but are not limited to, activating and running the selected CV function 112, terminating CV function 112, suspending CV function 112 until a condition is fulfilled, or changing an associated CV function 112 to correspond with the updated state of symbol 152. Video analytics system 132-A may execute the instructions received from controller module 120.

Figure 6:
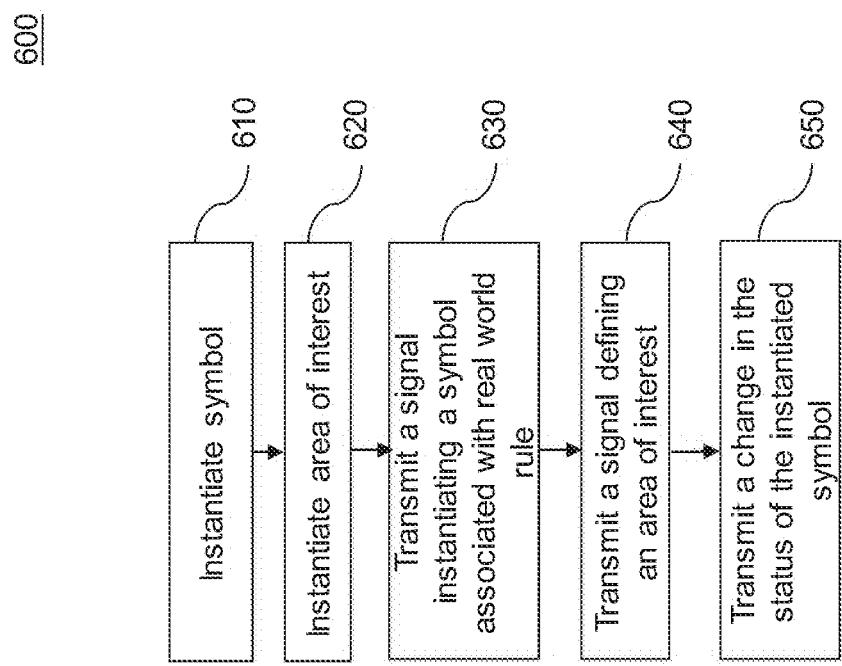
FIG. 6 illustrates an example of a method for a dynamic symbol-based system for OOI video analytics detection using a client control module, according to some embodiments.

FIG. 6 is a flowchart illustrating method 600 for a dynamic symbol-based system for OOI video analytics detection using a client control module, according to some embodiments. As a convenience and not a limitation, FIG. 6 may be described with reference to elements of FIGS. 1-5. In some embodiments, method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

At 610, client control module 160 (e.g., client control agent 162) instantiates symbol 152 in client control module 160. Client control agent 162 may determine a symbol 152 that represents the intended purpose associated with real world rule 142. Client control agent 162 may perform a control function 164 in the client control module 160 to instantiate symbol 152. Control function 164 includes, but is not limited to, dragging and dropping symbol 152, situating and displaying symbol 152 on a map, and/or associating location coordinates to symbol 152 based on a location reference system. Client control module 160 may include an interface displaying a representation of a physical space, including, but not limited to, a map, floor plan, or other diagram representing a physical space. Client control agent 162 may instantiate symbol 152 upon performing control function 164 in client control module 160.

At 620, client control agent 162 instantiates an area of interest in client control module 160. Client control agent 162 may determine an area of interest that represents the area in which video analytics system 132-A processes CV function 112 to detect OOI. Client control agent 162 may define an area of interest based on the approximate coordinates of the area in which video analytics system 132-A processes CV function 112. Client control agent 162 may use information related to the referential objects surrounding the signage stored in the video analytics data store 172 to determine the area of interest in the client control module 160.

In some embodiments, electronic signage may transmit some approximate coordinates of the electronic signage or referential objects to the electronic signage to controller module 120. Controller module 120 may transmit the stored approximate coordinates of the electronic signage and referential objects to client control module 160. Client control agent 162 may define the area of interest based upon the coordinates of the electronic signage and referential objects received from the client control module 160.

Client control agent 162 may represent the area of interest in the graphical user interface coupled to the client control module 160 with lines or a shape representing the boundaries of the area of interest. The set of points defining the lines or shape may approximately correspond to the coordinates of the area in which video analytics system 132-A processes CV function 112.

At 630, client control module 160 may transmit instantiated symbol 152 to controller module 120. Instantiated symbol 152 may have a corresponding symbol ID. Client control module 120 may transmit data related to instantiated symbol 152 and/or the corresponding symbol ID to controller module 120.

At 640, client control module 160 transmits the instantiated area of interest to controller module 120. Client control module 160 may transmit the coordinates defining the area of interest displayed on the map in the graphical user interface of client control module 160 to controller module 120.

At 650, client control module 160 transmits a change in the status of instantiated symbol 152 to controller module 120. Controller module 120 includes a status store 174 containing data related to the instantiated symbol 152 and the area of interest. Client control agent 162 may perform a new control function on the client control module that changes the status of instantiated symbol 152 and/or the area of interest. The new control function 164 changing the status of instantiated symbol 152 and/or the area of interest may include removing instantiated symbol 152 from client control module 160, adding a new symbol 152 to client control module 160, or adjusting the area of interest on the client control module 160. Based on any changes to instantiated symbol 152 and/or the area of interest in client control module 160, client control module 160 may transmit an input including the update to the status of instantiated symbol 152 and/or the area of interest to controller module 120.

Figure 7:
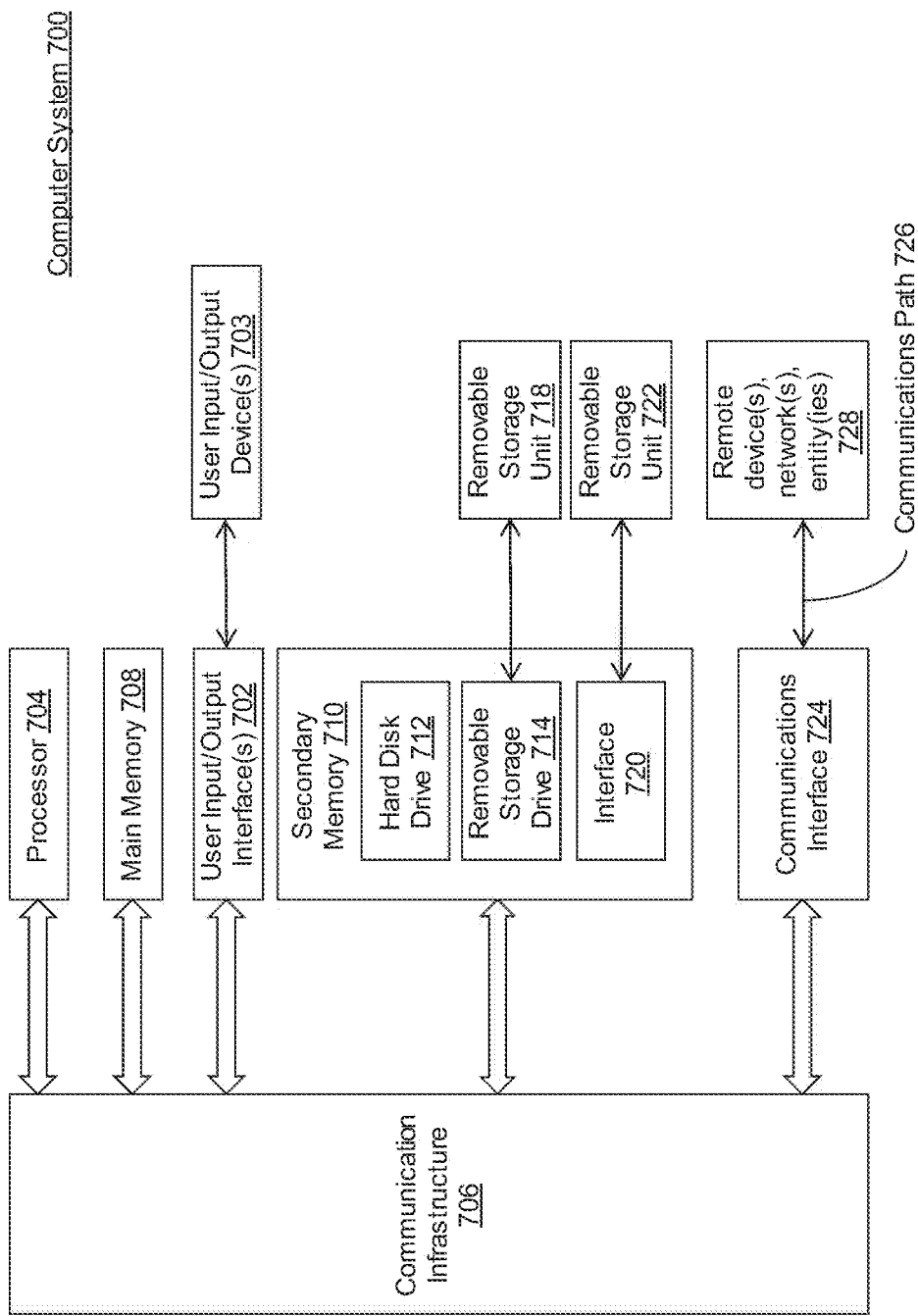
FIG. 7 illustrates an example computer system useful for implementing various embodiments or portion(s) thereof.

Various embodiments can be implemented, for example, using one or more computer systems, such as computer system 700 shown in FIG. 7. FIG. 7 is described with reference to FIG. 1-FIG. 6. Computer system 700 can be used, for example, to implement elements of FIG. 1 including a video analytics system 132, controller module 120, client control module 160, method 400 of FIG. 4, method 500 of FIG. 5, and method 600 of FIG. 6. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure 706 that can be a bus.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 603, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for a controller, comprising:
   receiving one or more symbolic objects associated with one or more real world signs via a graphical user interface (GUI), wherein the GUI recognizes that the one or more symbolic objects have been dragged and dropped onto the GUI;
   dynamically instantiating in real-time, the one or more symbolic objects representing intended purposes and one or more real world rules corresponding to particular classes of objects-of-interest (OOI) that are different than a current intended use context;
   receiving an area of interest corresponding to a boundary defined on the GUI;
   associating one or more computer vision (CV) functions with the one or more real world rules corresponding to the particular classes of OOI; and
   identifying one or more video sources in the area of interest.

2. The method of claim 1, further comprising:
   instantiating the one or more CV functions with one or more configuration parameters;
   applying a configuration parameter of the one or more configuration parameters to refine a CV function of the one or more CV functions; and
   identifying a particular class of OOI of the particular classes of OOI via the GUI according to the refined CV function.

3. The method of claim 1, further comprising:
   transmitting instructions corresponding to the one or more CV functions associated with the one or more symbolic objects to a video analytics system, wherein the one or more CV functions are applied in real-time to video from the video sources.

4. The method of claim 1, wherein the dynamically instantiating in real-time, the one or more symbolic objects comprises:
   dynamically instantiating in real-time, the one or more symbolic objects on a map;
   associating location coordinates to the one or more symbolic objects on the map; and
   displaying a representation of a physical space according to the location coordinates.

5. The method of claim 4,
   wherein the boundary defined on the GUI comprises a shape correlating to the representation of the physical space.

6. The method of claim 1, further comprising:
   receiving video analytics data detected in a field of view of the one or more video sources; and
   associating the video analytics data of the one or more symbolic objects with a different OOI model.

7. The method of claim 6, further comprising:
   detecting one or more referential objects in the field of view of the one or more video sources;
   receiving video analytics data related to the one or more referential objects in the field of view comprising at least coordinates of the one or more referential objects; and
   instantiating a second area of interest based on the at least coordinates of the one or more referential objects.

8. The method of claim 1, further comprising:
   receiving a change to a status of the one or more symbolic objects; and
   receiving a corresponding instruction for the one or more CV functions based on the change to the status of the one or more symbolic objects.

9. A system, comprising:
   a memory; and
   a processor coupled to the memory, configured to:

receive one or more symbolic objects associated with one or more real world signs via a graphical user interface (GUI), wherein the GUI recognizes that the one or more symbolic objects have been dragged and dropped onto the GUI;

dynamically instantiate in real-time, one or more real world rules corresponding to particular classes of objects-of-interest (OOI) that are different than a current intended use context;

receive an area of interest corresponding to a boundary defined on the GUI;

associate one or more computer vision (CV) functions with the one or more real world rules corresponding to the particular classes of OOI; and identify one or more video sources in the area of interest.

10. The system of claim 9, wherein the processor is further configured to:

instantiate the one or more CV functions with one or more configuration parameters;

apply a configuration parameter of the one or more configuration parameters to refine a CV function of the one or more CV functions; and identify a particular class of OOI of the particular classes of OOI via the GUI according to the refined CV function.

11. The system of claim 9, wherein the processor is further configured to:

transmit instructions corresponding to the one or more CV functions associated with the one or more symbolic objects to a video analytics system, wherein the one or more CV functions are applied in real-time to video from the video sources.

12. The system of claim 9, wherein to dynamically instantiate in real-time the one or more symbolic objects, the processor is configured to:

dynamically instantiate in real-time, the one or more symbolic objects on a map;

associate location coordinates to the one or more symbolic objects on the map; and display a representation of a physical space according to the location coordinates.

13. The system of claim 12, wherein the boundary defined on the GUI comprises a shape correlating to the representation of the physical space.

14. The system of claim 9, wherein the processor is configured to:

receive video analytics data detected in a field of view of the one or more video sources; and associate, the video analytics data of the one or more symbolic objects with a different OOI model.

15. The system of claim 14, wherein the processor is further configured to:

detect one or more referential objects in the field of view of the one or more video sources;

receive video analytics data related to the one or more referential objects in the field of view comprising at least coordinates of the one or more referential objects; and instantiate, a second area of interest based on the coordinates of the one or more referential objects.

16. The system of claim 9, wherein the at least one processor is configured to:

receive a third signal indicating a change to a status of the one or more symbolic objects; and receive an instruction for the one or more CV functions based on the change to the status of the one or more symbolic objects.

17. A non-transitory computer-readable medium having instructions stored thereon that, when executed by at least one computing device, cause the at least one computing device to perform operations comprising:

receiving one or more symbolic objects associated with one or more real world signs via a graphical user interface (GUI), wherein the GUI recognizes that the one or more symbolic objects have been dragged and dropped onto the GUI;

dynamically instantiating in real-time, the one or more symbolic objects representing intended purposes and one or more real world rules corresponding to particular classes of objects-of-interest (OOI) that are different than a current intended use context;

receiving an area of interest corresponding to a boundary defined on the GUI;

associating one or more computer vision (CV) functions with the one or more real world rules corresponding to the particular classes of OOI; and identifying one or more video sources in the area of interest.

18. The non-transitory computer-readable medium of claim 17, the operations further comprising:

receiving video analytics data detected in a field of view of the one or more video sources; and associating the video analytics data of the one or more symbolic objects with a different OOI model.

19. The non-transitory computer-readable medium of claim 17, wherein the intended purposes comprise a changing intended use context, the operations further comprise:

instantiating a different CV function corresponding to a different OOI model; and transmitting instructions corresponding to the different CV function to a corresponding video analytics system.

20. The non-transitory computer-readable medium of claim 17, wherein the dynamically instantiating in real-time operation further comprises:

dynamically instantiating in real-time, the one or more symbolic objects on a map;

associating location coordinates to the one or more symbolic objects on the map; and displaying a representation of a physical space according to the location coordinates.

* * * * *